US 6,676,992 B2

(12) United States Patent
Pfaendtner et al.

(10) Patent No.: US 6,676,992 B2
(45) Date of Patent: Jan. 13, 2004

(54) ARTICLE PROTECTED BY A DIFFUSION ALUMINIDE COATING APPLIED BY PAINTING TECHNIQUES

(75) Inventors: Jeffrey Allan Pfaendtner, Blue Ash, OH (US); Michael James Weimer, Loveland, OH (US); William Evan McCormack, West Chester, OH (US); Joseph David Rigney, Milford, OH (US); Mark Lloyd Miller, Schenectady, NY (US); John Lewis Lackman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 09/934,752

(22) Filed: Aug. 22, 2001

(65) Prior Publication Data

US 2003/0152705 A1 Aug. 14, 2003

(51) Int. Cl.$^7$ .............................. B05D 3/02; B05D 1/36; B05D 3/04
(52) U.S. Cl. .................. 427/142; 427/287; 427/376.1; 427/376.6; 427/404; 427/405; 427/377; 427/350; 427/430.1; 427/421; 427/429
(58) Field of Search ................................ 427/142, 287, 427/375, 376.1, 376.6, 419.1, 404, 405, 377, 350, 430.1, 421, 429

(56) References Cited

U.S. PATENT DOCUMENTS

| 4,004,047 A | * | 1/1977 | Grisik ........................ 29/402.18 |
| 4,031,274 A | * | 6/1977 | Bessen ........................ 148/527 |
| 4,070,507 A | * | 1/1978 | Stueber et al. ............... 148/518 |
| 5,366,765 A | * | 11/1994 | Milaniak et al. ............ 427/229 |
| 5,807,428 A | | 9/1998 | Bose et al. |
| 5,824,366 A | | 10/1998 | Bose et al. |
| 6,093,498 A | * | 7/2000 | Baldi ........................... 148/537 |

* cited by examiner

*Primary Examiner*—Michael Barr
(74) *Attorney, Agent, or Firm*—Gregory O. Garmong; Kurt L. Ehresman; McNees Wallace & Nurick LLC

(57) ABSTRACT

A method for coating an article includes preparing a coating precursor paint including aluminum-containing pigment particles, a temporary organic binder comprising an acrylic, and a solvent for the temporary organic binder. The coating precursor paint is applied to a surface of the article and thereafter heated to a temperature of from about 1200° F. to about 2100° F. in a non-oxidizing environment.

32 Claims, 3 Drawing Sheets

ARTICLE PROTECTED BY A DIFFUSION ALUMINIDE COATING APPLIED BY PAINTING TECHNIQUES

This invention relates to the application of a diffusion aluminide coating on a surface, and in particular, to the application of such a coating from an aluminum-containing paint.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of turbine blades, turbine vanes, and other hot-section components to their current levels. In one such approach, the article is protected by a diffusion aluminide protective coating with an optional ceramic thermal barrier coating overlying the protective coating.

During service, the portions of the hot-section components that are exposed to the most severe conditions of temperature and environment are sometimes damaged so that some of the underlying material is lost, thereby changing the dimensions of the hot-section component and adversely affecting its functionality. When such damage is detected, the damaged article is removed from service. If the damage is not too extreme, the damaged article may be repaired and later returned to service.

When the article is repaired, the protective coating and the thermal barrier coating may be removed, and the damaged region is built up by welding. A new protective coating and new thermal barrier coating may be deposited to complete the repair.

The removal of the entire protective coating and thermal barrier coating, and the deposition of new coatings, is an expensive and time-consuming process. For some types of repairs, it would be desirable to leave these coatings in place in those areas which are not being repaired, so that only the repaired area would be recoated. However, this partial recoating is not possible with the existing approach for applying the diffusion aluminide protective coating.

There is accordingly a need for an improved approach to applying a protective coating to hot-section components of gas turbine engines and comparable articles, which permits partial removal of the protective coating and partial recoating. The present invention fulfills this need, and further provides related advantages.

BRIEF SUMMARY OF THE INVENTION

The present invention provides a technique for applying a diffusion aluminide coating to a surface of an article such as a nickel-base superalloy. The coating is performed by painting techniques from a paint composition that is distinct from a slurry that contains a halide activator. Upon heating, the coating proceeds by a condensed-phase (solid or liquid) reaction. There is substantially no gaseous phase beyond ordinary vapor pressure that can coat those portions of the article which are desirably not coated. Vapor-phase masking of these portions that are not to be coated is not required during heating, although paint masking may be used during application of the coating precursor paint in the same manner as conventional painting.

A method for coating an article includes providing an article to be coated such as a gas turbine component made of a nickel-base superalloy. A coating precursor paint comprising aluminum-containing pigment particles, a temporary thin-film-forming binder comprising an organic resin such as an acrylic, and a solvent for the temporary binder is prepared. The coating precursor paint is applied to a surface of the article, and thereafter the coating precursor paint is heated to a temperature of from about 1200° F. to about 2100° F. in a non-oxidizing environment. The heating step may be performed in vacuum, a non-oxidizing atmosphere such as an inert gas, or in a low partial pressure of oxygen gas in some cases.

The aluminum-containing pigment particles may be substantially pure aluminum. In another embodiment, the aluminum-containing pigment particles may comprise aluminum and at least one other alloying element selected from group consisting of platinum, hafnium, zirconium, yttrium, lanthanum, cerium, chromium, palladium, silicon, nickel, cobalt, and titanium, and mixtures thereof.

The temporary organic binder is present to aid in holding the pigment particles together during processing and to the surface of the article during application and prior to completion of the heating step. The temporary organic binder is depolymerized during heating and leaves little if any residue in the final diffusion aluminide coating. The temporary binder is an organic material, preferably an acrylic, and most preferably a methacrylate such as butyl methacrylate resin, ethyl methacrylate resin, methyl methacrylate resin, or methacrylate co-polymer resin. Other less-preferred temporary organic binders include alkyd resins, shellac, rosin, rosin derivatives, ester gum, vinyls, styrenics, polyesters, epoxies, polyurethanes, and cellulose derivatives, and mixtures thereof.

Other layers may optionally be applied in conjunction with the diffusion aluminide coating. For example, a first coating layer comprising platinum, palladium, or chromium may be applied to the surface of the article prior to coating with the diffusion aluminide. A ceramic thermal barrier layer may be applied overlying the diffusion aluminide coating.

The coating precursor paint may be applied by any operable method, with examples being dipping, brushing, and spraying. The amount of solvent is selected consistent with the application technique. Spray painting requires more fluidity and thence more solvent than does brushing, for example.

There is no activator such as a halide activator present in the coating precursor paint. The activator is used in slurries to effect coating by a vapor phase mass transport from the source particles to the surface being coated. While the activator approach is operable and widely used, it has the disadvantage that the aluminum-containing vapor is difficult to contain so that it does not coat portions of the article surface that are desirably left uncoated. Vapor-phase maskants to prevent penetration and coating by the aluminum-containing vapor are known, but these vapor-phase maskants are difficult to use and not always fully effective. In the present case, the aluminum is transported to the surface of the article in a condensed phase, typically the liquid phase, and there is very little aluminum vapor present except for that associated with the normal vapor pressure. Thus, in some cases the coating precursor paint of the present invention may be applied to only a portion of the surface of the article. The step of heating the coating precursor paint may be performed without a vapor-phase mask overlying the portion of the surface of the article to which no coating precursor paint is to be applied and is not to be coated.

The present invention thus provides a technique for applying a diffusion aluminide coating to a surface. The source of the diffusion aluminide coating is a non-activated paint that is mixed and applied by conventional painting techniques. The diffusion aluminide coating is confined to the areas that are initially coated with the coating precursor paint, without the need for a vapor-phase mask to be present during the heating that transforms the applied precursor paint to a diffusion aluminide coating.

The present approach is particularly advantageously utilized in repair operations. The halide activator used in other techniques for applying a diffusion aluminide coating may chemically attack the portion of the ceramic thermal barrier coating that is not removed in the repair process. The present approach has no halide activator, and therefore the paint may be applied in areas adjacent to those where the pre-existing diffusion aluminide coating and ceramic thermal barrier coating have not been removed without concern that there will be a halide activator present to attack the ceramic thermal barrier coating. As a result, the present approach allows a partial removal of the pre-existing coating only in the areas where there is to be a repair, and then recoating of those areas after the repair, without damaging the pre-existing coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
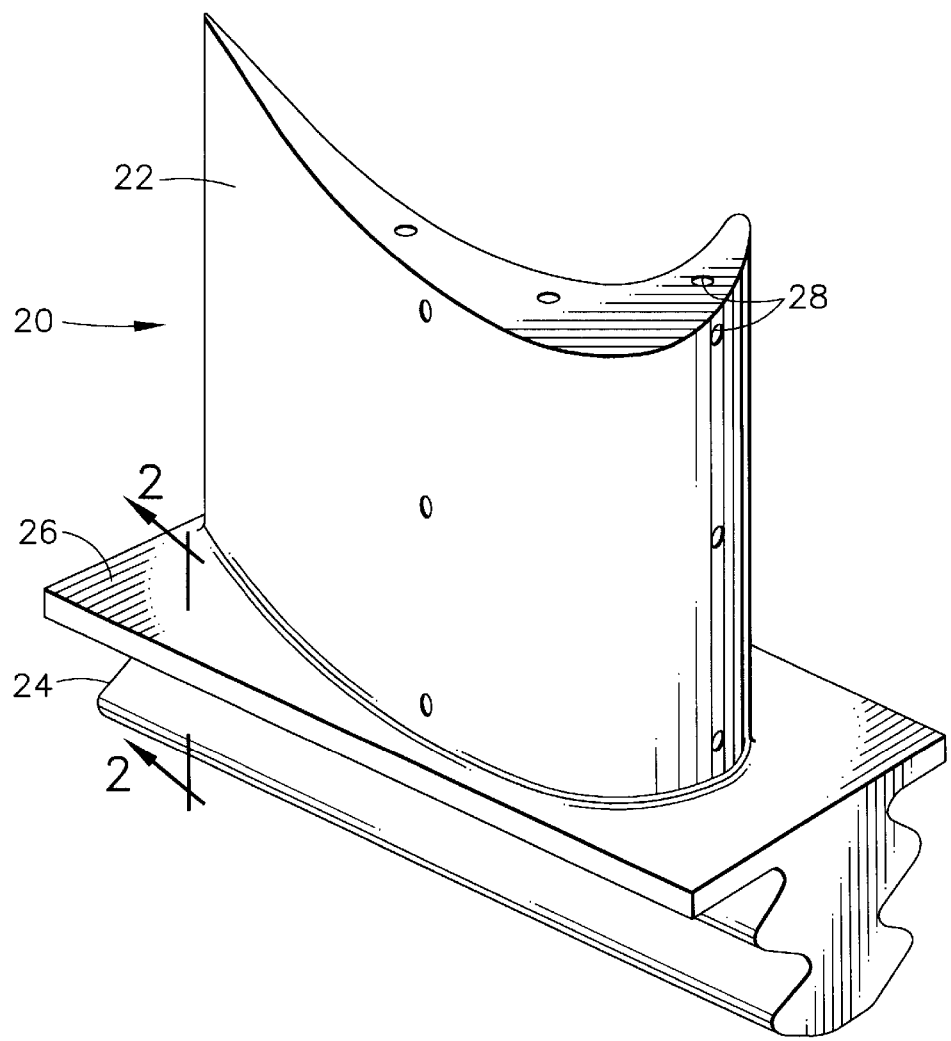
FIG. 1 is a perspective view of a turbine blade.

FIG. 1 depicts a component article of a gas turbine engine such as a turbine blade or turbine vane, and in this illustration a turbine blade 20. Other articles that benefit from the present approach include, for example, combustor components, centerframes, shrouds, honeycombs, turbine disks, fuel nozzles, deflector plates, and turbine seals.

In the illustrated example, the turbine blade 20 is formed of any operable material, but is preferably a nickel-base superalloy. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22.

Figure 2:
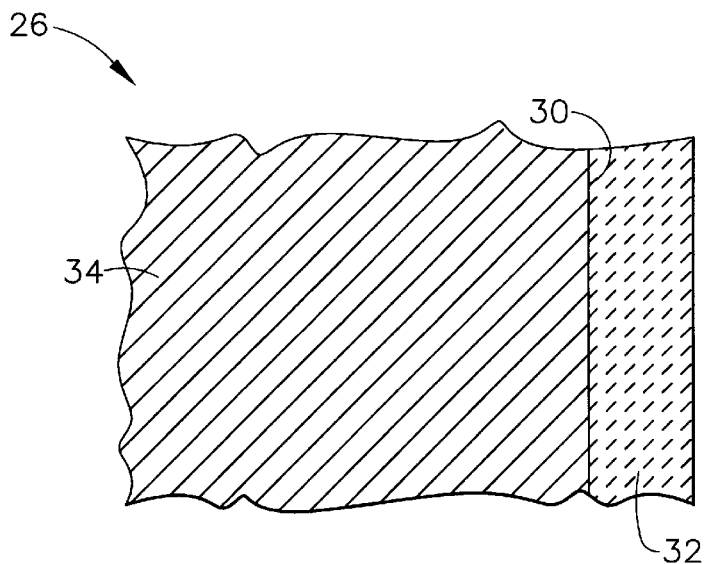
FIG. 2 is an enlarged schematic sectional view through the turbine blade of FIG. 1, taken on lines 2—2.

With the operating temperatures of the turbine blades 20 being extended to ever-higher temperatures, it is becoming necessary to protect portions of the turbine blades not heretofore requiring protection. FIG. 2 is a sectional view through the platform 26. It is necessary in some circumstances to protect the underside surface 30 of the platform 26 of the turbine blade 20. A diffusion aluminide coating 32 is applied to the underside surface 30 for this purpose. The platform 26 serves as a substrate 34 for this diffusion aluminide coating 32.

Figure 3:
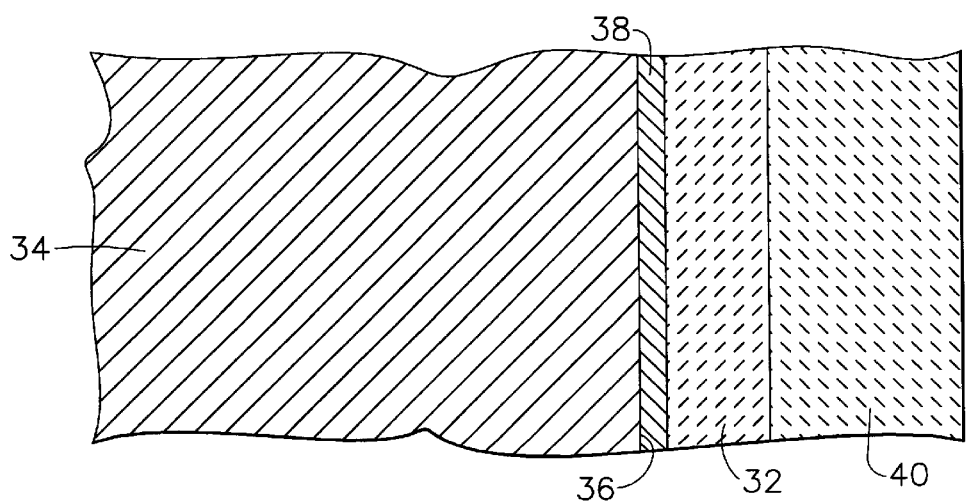
FIG. 3 is a schematic sectional view like that of FIG. 2, but of another embodiment.

FIG. 3 is a schematic sectional view like that of FIG. 2, except more generally illustrating a substrate 34 having a surface 36 with an optional first coating layer 38 applied thereon. (FIGS. 2 and 3 are not drawn to scale.) The diffusion aluminide coating 32 is applied overlying and contacting the first coating layer 38. A ceramic thermal barrier coating 40 is optionally applied overlying and contacting the diffusion aluminide coating 32. FIG. 3 is schematic in the sense that the heating that is part of the application of the diffusion aluminide layer 32 serves to interdiffuse the first coating layer 38, the diffusion aluminide coating 32, and the adjacent portions of the substrate 34 to which they are applied. The sharp demarcations between the substrate 34, the first coating layer 38, and the diffusion aluminide coating 32 are blurred and lost during this heating. After heating to effect such interdiffusion, the final coating will be termed the diffusion aluminide coating 32.

Figure 4:
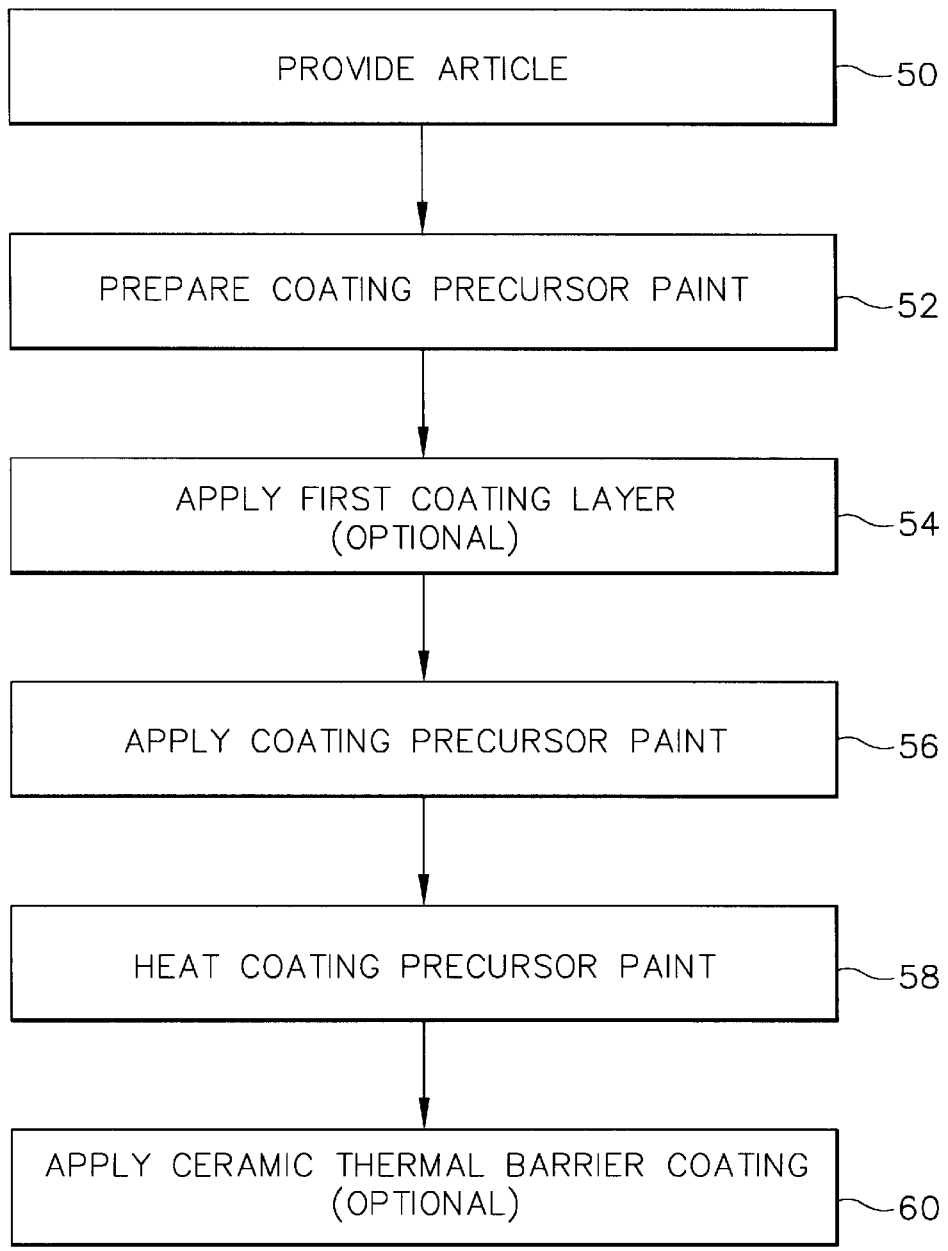
FIG. 4 is a block flow diagram of an approach for preparing an coated gas turbine airfoil.

FIG. 4 is a block flow diagram of a preferred method for practicing the invention. An article is provided, numeral 50. The article is preferably a component of a gas turbine engine such as a gas turbine blade or vane (or "nozzle", as the vane is sometimes called), or any of the other articles discussed earlier. The article is most preferably made of a nickel-base superalloy. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The article such as the turbine blade 20 may be a newly made article. It may instead be an article that has previously been in service and has been damaged so that it requires a weld repair. In that case, a pre-existing coating that overlies a first portion of the article that is to be repaired may have already been removed. The later-discussed step of applying the coating precursor paint would then be performed after the weld repair has been completed, so that the newly applied coating precursor paint and resulting diffusion aluminide layer are applied over and near the area of the weld repair.

A coating precursor paint is prepared, numeral 52. The coating precursor paint is made by mixing together aluminum-containing pigment particles, a temporary organic binder such as an acrylic, and a solvent for the temporary binder. The aluminum-containing pigment particles may be substantially pure aluminum, or they may be alloys of aluminum and other alloying elements. Examples of elements that may be alloyed with the aluminum and provided in particle form include platinum, hafnium, zirconium, yttrium, lanthanum, cerium, chromium, palladium, silicon, nickel, cobalt, and titanium. The alloying elements may be present to improve the corrosion resistance of the diffusion aluminide coating, reduce the incidence and severity of spallation, suppress the formation of deleterious phases as a result of the interdiffusion, and other reasons.

Platinum is an alloying element of particular interest, as platinum aluminide diffusion coatings are known to have good oxidation and corrosion resistance. A diffusion aluminide coating 32 of interest contains from about 1 to about 30 weight percent platinum, from about 14 to about 37 weight percent aluminum, balance elements interdiffused into the diffusion aluminide coating 32 from the substrate during heating.

The particle size of the aluminum-containing particles is not critical, but the particle size must be sufficiently small to allow the paint to be applied in the desired thickness. The aluminum-containing particles are preferably in the form of flakes from about 0.1 to about 5 micrometers thick and from about 5 to about 50 micrometers in diameter. Such flakes produce good coverage of the surface upon melting and subsequent solidification.

The temporary organic binder is present in the paint in order to bind the aluminum-containing particles to each other and to the surface of the article after the paint is applied. Upon subsequent heating, the temporary organic binder depolymerizes, and is substantially entirely removed so that little if any organic residue remains. The temporary binder must allow the formation of a paint layer on the surface and remain present until the aluminum-containing particles have melted or sintered to the surface. A class of organic binders that meets these requirements is acrylics. Acrylics are excellent thin-film formers, allowing the coating precursor paint to be formed and applied as a smooth layer of uniform thickness. Upon heating, the acrylics remain for a sufficient time to allow the aluminum-containing particles to melt onto the surface or sinter onto the surface. Upon further heating, the acrylics or their by-products depolymerize to gaseous products, which are removed from the surface of the article with little or no residue remaining. Examples of operable and preferred acrylics for use as the temporary binder include, but are not limited to, butyl methacrylate resin, ethyl methacrylate resin, methyl methacrylate resin, methacrylate co-polymer resin. Examples of other operable but less preferred temporary binders include alkyd resins such as phenolic-modified alkyd or phenolic-modified soybean alkyd, shellac, rosin, rosin derivatives, ester gum, vinyls, styrenics, polyesters, epoxies, polyurethanes, and cellulose derivatives, and mixtures thereof.

The class of methacrylates was chosen as the most preferred temporary binder because of its excellent film-forming capabilities and the chemistry of this class of compounds. These compounds depolymerize in the temperature range of from about 350° F. to about 425° F. to the base monomers which are gases at these temperatures. These monomers are fugitive, leaving little or no contamination. In general other acrylates do not undergo the depolymerization reaction to the same extent.

The solvent is a solvent for the temporary organic binder material. The solvent may be, for example, an alcohol, ester, hydrocarbon, or ketone, or blends thereof, as may be suitable for the selected resin.

The coating precursor paint does not contain an activator, and specifically does not contain a halide activator, either before or after application to the substrate. Activators are used in vapor-phase aluminiding (VPA) and slurry coating in order to accomplish a vapor-phase transport of the aluminum from a solid particulate phase to the substrate, where it deposits. The present approach intentionally avoids the presence of vapor-phase aluminum, except for a small amount of aluminum vapor that results from the normal vapor pressure of the aluminum. Vapor-phase aluminiding and related techniques such as slurry coating are advantageous for some applications, but they have major disadvantages for other applications. Where the diffusion aluminide coating 32 is to be specifically confined to only a portion of the substrate—less than the entire substrate—during a repair operation or other procedure, then any aluminum vapor must be confined or prevented from reaching the remainder of the surface with effective vapor-phase maskants. Such vapor-phase maskants are expensive and difficult to apply in some circumstances. In the present case, there is no activator present, and the aluminiding is accomplished with the aluminum in the liquid or solid condensed states of matter, so that vapor-phase maskants are not required. The presence of the diffusion aluminide coating 32 is thereby limited to the regions where it is intentionally applied.

The temporary organic binder material is typically furnished in the form of a solid organic resin that is dissolved in the solvent, and then the aluminum-containing particles are mixed into the solution of resin and solvent. The concentration of the resin (i.e., the temporary organic binder) is preferably, but not necessarily, from about 5 to about 30 percent by weight of the total of the resin plus solvent. The concentration of aluminum-containing particles is preferably, but not necessarily, from about 5 to about 40 percent by weight of the total of the aluminum-containing particles, the temporary organic binder, and the solvent. If the concentration is less than about 5 percent, there is insufficient aluminum present in the final coating. If the concentration is more than about 40 percent, the paint is too viscous, lumpy, and cannot be applied readily to produce a smooth surface. A typical concentration is from about 5 to about 20 percent by weight. The amount of solvent is selected according to the method of application that is to be used. More solvent may be added if the paint is too viscous to be applied by the selected technique, and the amount of solvent may be reduced if the paint is too low in viscosity to be applied by the selected technique.

To prepare the paint, in a typical situation the resin is added to the solvent and dissolved. Then the aluminum-containing particles are added to and mixed with the resin/solvent solution.

The first coating layer 38 may optionally be applied, numeral 54, to the surface of the substrate prior to application of the coating precursor paint. In the case of a platinum, palladium, or chromium first coating layer 38, the first-coating application step 54 is preferably accomplished by electrodeposition or painting. For the preferred platinum deposition, the deposition is preferably accomplished by placing a platinum-containing solution into a deposition tank and depositing platinum from the solution onto the substrate 34. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum first coating layer 38, which is preferably from about 1 to about 6 micrometers thick and most preferably about 5 micrometers thick, is deposited in 1–4 hours at a temperature of 190–200° F.

The coating precursor paint is applied to the substrate, numeral 56. The coating precursor paint may be applied by any operable technique and in any operable thickness. Examples of application techniques include dipping, brushing and spraying. Dipping is particularly preferred to coat otherwise-inaccessible locations. The thickness of the applied layer of the paint after drying is preferably from about 0.0020 to about 0.0070 inches, so that the thickness of the diffusion aluminide coating 32 after heating and consolidation is from about 0.0015 to about 0.003 inches. If a thicker coating 32 is desired, it is preferred to apply multiple coats of the coating precursor paint, allowing each coat to dry before the next coat is applied, or to vary the aluminum pigment content of the wet paint.

The coating precursor paint may be applied over all of the surface of the substrate, or only a portion of the surface. Where the coating precursor paint is applied over only a portion of the surface of the substrate, a painting mask may be used during the application step 56 to prevent the flowable coating precursor paint from running to portions of the surface that are not to be coated. The painting mask is a conventional mask such as used in conventional painting, and may be as simple as masking tape or a paper mask. The painting mask is contrasted with a vapor-phase maskant, which is not used in the present approach because there is no activator in the coating precursor paint.

The coating precursor paint is dried at the conclusion of the application step 56. It may be air dried, or heated slightly. In either case, the drying accomplishes evaporation and removal of the solvent carrier from the applied paint, leaving the aluminum-containing particles and the temporary binder.

The coating precursor paint is thereafter heated, numeral 58. Typically, the heating is accomplished in an oven having a non-oxidizing—vacuum, inert (e.g., argon), or reducing—atmosphere, so that both the coating precursor paint (minus the solvent) and the substrate article are heated. The heating is to a temperature of from about 1200° F. to about 2100° F. for a time of from about 1 to about 16 hours. During the initial portion of the heating, the temporary organic binder binds the aluminum-containing particles together and to the substrate 34 or underlying first coating layer 38, where present. At higher temperatures, the temporary binder is depolymerized to gaseous products, but by this temperature the aluminum-containing particles have either melted or sintered to the surface of the first coating layer 38 and/or the substrate 34 and remain in place. During the continuation of the heating, the material of the aluminum-containing particles interdiffuses with the substrate 34 and with the first coating layer 38, where present. The resulting diffusion aluminide protective coating 32 is typically from about 0.0015 to about 0.003 inch thick, although thicker and thinner coatings 32 are operable and may be formed as desired.

Optionally, the ceramic thermal barrier coating 40 is applied overlying the diffusion aluminide coating 32, numeral 60. The ceramic layer thermal barrier coating 40 is preferably yttria-stabilized zirconia, which is zirconium oxide containing from about 2 to about 12 weight percent, preferably from about 3 to about 8 weight percent, of yttrium oxide. The ceramic layer 48 is typically from about 0.003 inch to about 0.010 inch thick, most preferably about 0.005 inch thick. Other operable ceramic materials may be used as well. When there is no ceramic thermal barrier coating 40 present, the diffusion aluminide coating 32 is termed an "environmental coating". When there is a ceramic thermal barrier coating 40 present, the diffusion aluminide coating 32 is termed a "bond coat". The ceramic thermal barrier coating 40 may be deposited by any operable technique, such as physical vapor deposition or thermal spray.

The present invention has been reduced to practice. Butyl methacrylate resin was dissolved in toluene to a 25 percent by weight concentration of resin in solvent plus resin. Aluminum-containing flake power, as described earlier, was mixed with the resin solution in a concentration of about 30 percent by weight of the total of resin solution plus aluminum-containing powder. A pin of Rene N5 nickel-base superalloy was dipped into the resulting paint and the paint was allowed to dry. The paint-coated pin was heated to 1975° F. for 4 hours in a vacuum of about $10^{-4}$ Torr. A diffusion aluminide coating 32 about 0.0025 inches thick resulted.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for coating an article, comprising the steps of
providing a nickel-base superalloy article to be coated;
preparing a coating precursor paint comprising aluminum-containing pigment particles, a temporary organic binder, and a solvent for the temporary organic binder; thereafter
applying the coating precursor paint to a surface of the article; and thereafter
heating the coating precursor paint to a temperature of from about 1200° F. to about 2100° F., wherein there is no activator present.

2. The method of claim 1, wherein the step of preparing a coating precursor paint includes the step of
furnishing aluminum-containing pigment particles comprising aluminum and at least one other element selected from group consisting of platinum, hafnium, zirconium, yttrium, lanthanum, cerium, chromium, palladium, silicon, nickel, cobalt, and titanium, and mixtures thereof.

3. The method of claim 1, wherein the step of preparing a coating precursor paint includes the step of
furnishing an acrylic resin as the temporary organic binder.

4. The method of claim 1, wherein the step of preparing a coating precursor paint includes the step of
furnishing a methacrylate resin as the temporary organic binder.

5. The method of claim 1, wherein the step of applying the coating precursor paint includes the step of
applying the coating precursor paint by a method selected from the group consisting of dipping, brushing, and spraying.

6. The method of claim 1, wherein the step of applying includes the step of
applying the coating precursor paint to only a portion of the surface of the article, and wherein the step of heating includes the step of
heating the coating precursor paint without a mask overlying a portion of the surface of the article to which no coating precursor paint was applied.

7. The method of claim 1, wherein the step of heating includes the step of
heating the coating precursor paint in a non-oxidizing environment.

8. The method of claim 1, wherein the step of heating includes the step of
heating the coating precursor paint in vacuum.

9. The method of claim 1, wherein the step of heating includes the step of
heating the coating precursor paint in an inert gas.

10. The method of claim 1, wherein the step of furnishing a coating precursor paint includes the step of
providing the temporary organic binder selected from the group consisting of alkyd resins, shellac, rosin, rosin derivatives, ester gum, vinyls, styrenics, polyesters, epoxies, polyurethanes, and cellulose derivatives, and mixtures thereof.

11. The method of claim 1, wherein the step of providing an article includes the step of
providing an article that has previously been in service.

12. The method of claim 1, wherein the step of providing an article includes the step of
providing an article that has previously been in service, removing a pre-existing coating that overlies a first portion of the article, and
repairing the article, and wherein the step of applying the coating precursor paint includes the step of
applying the coating precursor paint overlying the first portion of the article.

13. The method of claim 1, including an additional step, prior to the step of applying, of
applying to the surface of the article a first coating layer comprising an element selected from the group consisting of platinum, palladium, and chromium.

14. A method for coating an article, comprising the steps of
providing the article, which has previously been in service, to be coated;
preparing a coating precursor paint comprising aluminum-containing pigment particles, a temporary organic binder, and a solvent for the temporary organic binder; thereafter
applying the coating precursor paint to a surface of the article; and thereafter
heating the coating precursor paint to a temperature of from about 1200° F. to about 2100° F., wherein there is no activator present.

15. The method of claim 14, wherein the step of providing an article includes the steps of
removing a pre-existing coating that overlies a first portion of the article, and
repairing the article, and wherein the step of applying the coating precursor paint includes the step of
applying the coating precursor paint overlying the first portion of the article.

16. The method of claim 14, including an additional step, prior to the step of applying, of applying to the surface of the article a first coating layer comprising an element selected from the group consisting of platinum, palladium, and chromium.

17. The method of claim 14, wherein the step of preparing a coating precursor paint includes the step of furnishing aluminum-containing pigment particles comprising aluminum and at least one other element selected from group consisting of platinum, hafnium, zirconium, yttrium, lanthanum, cerium, chromium, palladium, silicon, nickel, cobalt, and titanium, and mixtures thereof.

18. The method of claim 14, wherein the step of preparing a coating precursor paint includes the step of furnishing an acrylic resin as the temporary organic binder.

19. The method of claim 14, wherein the step of preparing a coating precursor paint includes the step of furnishing a methacrylate resin as the temporary organic binder.

20. The method of claim 14, wherein the step of applying the coating precursor paint includes the step of applying the coating precursor paint by a method selected from the group consisting of dipping, brushing, and spraying.

21. The method of claim 14, wherein the step of applying includes the step of applying the coating precursor paint to only a portion of the surface of the article, and wherein the step of heating includes the step of heating the coating precursor paint without a mask overlying a portion of the surface of the article to which no coating precursor paint was applied.

22. The method of claim 14, wherein the step of heating includes the step of heating the coating precursor paint in a non-oxidizing environment.

23. The method of claim 14, wherein the step of heating includes the step of heating the coating precursor paint in vacuum.

24. The method of claim 14, wherein the step of heating includes the step of heating the coating precursor paint in an inert gas.

25. The method of claim 14, wherein the step of furnishing a coating precursor paint includes the step of providing the temporary organic binder selected from the group consisting of alkyd resins, shellac, rosin, rosin derivatives, ester gum, vinyls, styrenics, polyesters, epoxies, polyurethanes, and cellulose derivatives, and mixtures thereof.

26. A method for coating an article, comprising the steps of providing the article to be coated;

applying to the surface of the article a first coating layer comprising an element selected from the group consisting of platinum, palladium, and chromium; thereafter preparing a coating precursor paint comprising aluminum-containing pigment particles, a temporary organic binder, and a solvent for the temporary organic binder; and thereafter heating the coating precursor paint to a temperature of from about 1200° F. to about 2100° F., wherein there is no activator present.

27. A method for coating an article, comprising the steps of providing a nickel-base superalloy article to be coated;

preparing a coating precursor paint comprising aluminum-containing pigment particles, a temporary organic binder comprising an acrylic, and a solvent for the temporary organic binder; thereafter applying the coating precursor paint to a surface of the article; and thereafter heating the coating precursor paint to a temperature of from about 1200° F. to about 2100° F. in a non-oxidizing environment, wherein there is no halide activator present.

28. The method of claim 27, including an additional step, prior to the step of applying, of applying to the surface of the article a first coating layer comprising an element selected from the group consisting of platinum, palladium, and chromium.

29. The method of claim 27, wherein the step of preparing a coating precursor paint includes the step of furnishing aluminum-containing pigment particles comprising aluminum and at least one other element selected from group consisting of platinum, hafnium, zirconium, yttrium, lanthanum, cerium, chromium, palladium, silicon, nickel, cobalt, and titanium, and mixtures thereof.

30. The method of claim 27, wherein the step of preparing a coating precursor paint includes the step of furnishing as the temporary organic binder an acrylic selected from the group consisting of butyl methacrylate resin, ethyl methacrylate resin, methyl methacrylate resin, and methacrylate co-polymer resin.

31. The method of claim 27, wherein the step of applying includes the step of applying the coating precursor paint to only a portion of the surface of the article, and wherein the step of heating includes the step of heating the coating precursor paint without a mask overlying a portion of the surface of the article to which no coating precursor paint was applied.

32. The method of claim 27, wherein the step of furnishing a coating precursor paint includes the step of providing the temporary organic binder comprising a methacrylate.

* * * * *